3,337,585
PROCESS FOR MAKING PYRROLIDONES
AND PIPERIDONES
Edward A. Swakon, Hammond, Ind., and Edmund Field, Chicago, Ill., assignors to Standard Oil Company, Chicago, Ill., a corporation of Indiana
No Drawing. Filed June 12, 1964, Ser. No. 374,820
5 Claims. (Cl. 260—326.5)

This application is a continuation-in-part of our copending application Ser. No. 94,700, filed Mar. 10, 1961.

This invention relates to the preparation of lactams and more specifically relates to the preparation of gamma-butyrolactams, delta-valerolactams and epsilon caprolactams by reacting, respectively, a carbonyl compound such as gamma-keto and gamma-aldehydic, delta-keto and delta-aldehydic, and epsilon-keto and epsilon-aldehydic acid or their esters with compounds having primary amine groups and with carbon monoxide.

It has been discovered that an open chain Schiff's base type compound having one to three units of the formula:

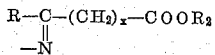

wherein R is hydrogen or an inert organic group mainly hydrocarbon in nature including carboxy hydrocarbon groups, preferably a hydrocarbon group or 2-carboxyethyl or 3-carboxypropyl as hereinafter further defined; $x$ is a number from 1 to 4, $R_2$ is hydrogen or a hydrocarbon group, preferably a lower alkyl hydrocarbon group, and the unsatisfied valence of nitrogen is attached to a mono-, di- or trivalent organic group, preferably $C_2$ to $C_{20}$ hydrocarbon, can be converted to a lactam having the formula:

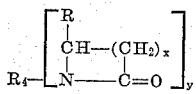

wherein R and $x$ are as above defined, $y$ is a number of from 1 to 3 and $R_4$ is the mono-, di- or trivalent organic group preferably when $y$ is 2 or 3 a $C_2$ to $C_3$ hydrocarbon, by heating the open chain Schiff's base type compound under carbon monoxide pressure of from 10 to 1000 atmospheres at a temperature of from 50 to 350° C. in the presence of water and an alkaline reaction medium. The reaction can be illustrated by the following equation to produce a lactam with only one of said lactam rings ($y$ is 1):

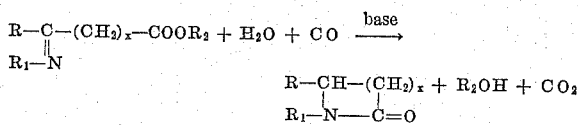

when $y$ is 1, $R_1$ can be $C_1$ to $C_{20}$ hydrocarbon or a hydroxyalkyl $C_1$ to $C_4$ hydrocarbon group.

The aforementioned Schiff's base type compounds are conveniently derived by reacting a gamma-keto and gamma-aldehydic, delta-keto and delta-aldehydic, and epsilon-keto and epsilon-aldehydric acid or their esters with a primary nitrogen base reactant having one to three primary amino (—$NH_2$) groups in the mole ratio of one to three moles of said aldehydric or keto acid for each —$NH_2$ group in said primary nitrogen base reactant. Thus, in place of the Schiff's base type compound, the process of this invention can be carried out employing beta-keto, beta-aldehydic, gamma-keto, gamma-aldehydic, delta-keto, delta-aldehydric, epsilon-keto, and epsilon-adehydic acids and their esters, preferably their lower alkyl esters, and said primary nitrogen base reactant which react to form in situ said open chain Schiff's base type compound and water. Under the conditions of the process of this reaction reductive amination and cyclization occur to form lactams having one to three of the above-indicated lactam rings. The process of this invention can be speeded up by maintaining an alkaline reaction medium. Where the keto acid or aldehydic acid and primary nitrogen base reactants are employed to form the open chain Schiff's base type compound, the basicity of the primary nitrogen base is generally sufficient to accelerate the reaction. However, where it is not, or a preformed open chain Schiff's base type compound is employed, it is advantageous to use an additional alkaline material as catalyst.

The process of this invention can be suitably carried out at 50 to 350° C., preferably 200 to 250° C., at a carbon monoxide pressure of from 10 to 1000, preferably 60 to 100 atmospheres. Suitably, water should be present in the range of from 0.1 to 10 mole per mole of the open chain Schiff's base type compound or the keto or aldehydic acid or ester reactant. Water generally need not be added when the keto or aldehydic acid and primary nitrogen base reactants are employed, but the addition of water has no deleterious effect on the reaction.

The process of this invention produces beta-propiolactones, gamma-butyrolactams (pyrrolidones), delta-valerolactams (piperidones) and epsilon caprolactams, where $x$ in the foregoing formulae is 1, 2, 3 and 4, respectively.

The term "primary nitrogen base," as employed herein in the specification and claims, defines a reactant having one or more —$NH_2$ groups as in ammonia including ammonium hydroxide, primary amines and alkanol amines. Particularly suitable primary amines include compounds which, other than the nitrogen of the primary (—$NH_2$) group, are composed exclusively of carbon and hydrogen atoms such as in the primary alkyl amines, alkylene diamines, alkylene triamines, aryl amines, arylene diamines, diarylene triamines, cycloalkyl amines, cycloalkyl diamines, and the like, as hereinafter exemplified. The preferred primary amines are those containing one to three —$NH_2$ groups with the mono-primary amines having $C_1$ to $C_{20}$ hydrocarbon groups and the di- and tri-primary amines, respectively, divalent and trivalent $C_2$ to $C_{20}$ hydrocarbon groups. It is essential that said $C_1$ to $C_{20}$ and $C_2$ to $C_{20}$ hydrocarbon groups be free from olefinic or acetylenic unsaturation to avoid competitive side reactions interfering with or preventing the desired amination and/or cyclization to form the lactam rings. Accordingly, said $C_1$ to $C_{20}$ and $C_2$ to $C_{20}$ hydrocarbon groups are saturated or aromatic unsaturated groups. For the same reason R in the aldehydic or keto acid or ester when not hydrogen or 2-carboxyethyl or 3-carboxypropyl is preferably a $C_1$ to $C_{10}$ saturated or aromatic unsaturated hydrocarbon groups.

When the process of this invention is carried out using a keto or aldehydic acid or ester and a preferred mono-primary amine of the preferred primary nitrogen base reactant, the process is believed to occur as follows to produce a single lactam ring product:

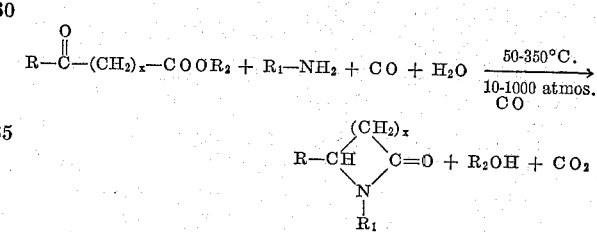

wherein R is preferably hydrogen or $C_1$ to $C_{10}$ saturated or aromatic unsaturated hydrocarbon, 2-carboxyethyl or 3-carboxypropyl, $R_1$ is preferably hydrogen, hydroxy substituted $C_1$ to $C_{20}$ alkyl hydrocarbon or $C_1$ to $C_{20}$ saturated or aromatic unsaturated hydrocarbon group and $x$ is a number of from 1 to 4. Thus $R_1$ when not hydrogen is an alkyl, cyclo-alkyl, aryl, alkaryl, aralkyl hydrocarbon groups of the aforementioned number of carbon atoms. When the primary amine has 2 or 3 —$NH_2$ group, $R_1$ becomes a di- or trivalent $C_2$ to $C_{20}$ saturated or aromatic unsaturated hydrocarbon group such as the di- or trivalent alkyl, cycloalkyl, aryl, alkaryl, aralkyl hydrocarbon groups.

The alkaline catalysts which can be used, in addition to the primary nitrogen base reactant, in the process of this invention can be illustrated by, but are not necessarily limited to, alkali metal formates and acetates, alkali or alkaline earth metal salts of keto acids, and tertiary amines. Specific additional catalysts can be supplied by sodium and potassium hydroxides, sodium and potassium acetates, sodium and potassium formates, calcium and barium oxides and hydroxides, and such tertiary amines as trimethyl, triethyl, triisobutyl, triisopropyl, triphenyl, tricyclohexyl amines and the like. Ammonium formate can supply the primary nitrogen base reactant as well as water and a portion of the carbon monoxide.

Illustrative of the preferred primary nitrogen base reactants suitable to react with the aldehydic or keto acids to form the open chain Schiff's base type compounds for the purposes of the process of this invention are ammonia or an alkaline ammonium compound (whose use results in the formation of 5-methyl-2-pyrrolidone from levulinic acid) and such hydrocarbon substituted primary amines as the primary alkyl amines such as methylamine, ethylamine, n-propylamine, isopropylamine, n-butylamine, isobutylamine, sec.-butylamine, tert.-butylamine, n-amylamine, isoamylamine, sec.-amylamine, tert.-amylamine, n-hexylamine, n-heptylamine, and octadecylamine; such cycloalkyl primary amines as cyclohexylamine, cyclopropylamine, and cycloheptylamine; such aromatic primary amines as aniline, 1-naphthylamine, 2-naphthylamine, o-toluidine, m-toluidine, p-toluidine, 2,3-xylidine, 2,4-xylidine, 2,5-xylidine, mesidine, 1-fluorenamine, 2-pyrenamine, 3 - biphenylamine and 4 - biphenylamine (xenylamine); such aralkyl primary amines as benzylamine, phenethylamine, 1-naphthalenemethylamine and 1-indanethylamine; such poly primary amines whose —$NH_2$ groups are joined by a hydrocarbon group as in putrescine, cadaverine, ethylenediamine, hexamethylenediamine, o-phenylenediamine, p - phenylenediamine, 1,4 - anthradiamine, 1,2 - propanediamine, 1,3 - propanediamine, 1,2-butanediamine, 3-(2-aminoethyl)-1,5-diaminopentane, 1,4-cyclohexanediamine, 1,4-naphthalenediamine, 1,2,3-benzenetriamine, 3,3'-biphenyldiamine, 3,4-biphenyldiamine, diethylenetriamine, triethylenetetramine, diphenylene triamine and triphenylenetetraamine, and aminoalcohols such as ethanol amine, 2-amino-1,1,2-triphenylethanol, 3-amino-n-propanol, 3-amino-3 methyl propanol, and 4-aminobutanol, among others.

Also to be included as useful primary nitrogen base reactants are those having the valence of a primary amino group, —$NH_2$, satisfied by heterocyclic rings having oxygen, nitrogen and/or sulfur atoms in the ring in addition to the carbon and hydrogen atoms. Such primary amines include 2-furanamine, 2-p-dioxanamine, 3-δ-pyranylamine, furfurylamine, 2-amino-pyrrole, 2,6-diamino-pyridine, 2,4-diamino-5-(aminomethyl)-pyrimidine, 1 - amino-acridine, 2,5-diamino-1,3,4-thiadiazole, among others of the same classes.

The primary nitrogen base reactants containing 2 or more primary amino groups joined by a hydrocarbon group or a group mainly hydrocarbon as for example in the ethylene-amino-ethylene chain of diethylene triamine and other polyethylene polyamines will produce compounds containing two or more lactam groups. For example, from the reaction of ethylene diamine with two moles of levulinic acid there results bis-1,2-[1-(5-methyl-2-pyrrolidone)]-ethane:

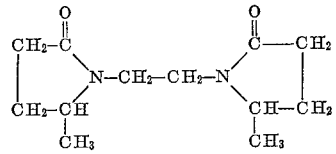

and from two moles of levulinic acid and p-phenylene diamine there results bis - 1,4 - [1 - (5 - methyl-2-pyrrolidone)]-benzene:

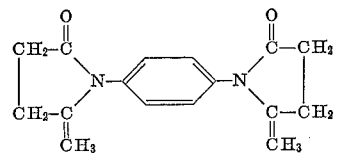

From one mole of a primary triamine and three moles of levulinic acid there results from the process of this invention a lactam having three 1-(5-methyl-2-pyrrolidone) groups.

Suitable aldehydic acids for the process of this invention are beta-formyl propionic acid, gamma-formyl butyric acid, and delta-formyl pentanoic acid. Suitable keto acids for the process of this invention include levulinic acid, gamma-oxo-hexanoic acid, gamma-oxo-heptanoic acid, gamma-oxo-octanoic acid, gamma-oxo-cyclohexane propionic acid, beta-benzoyl propionic acid, beta-toluyl propionic acids, beta-xyloyl propionic acids, beta-1- and 2-naphthoyl propionic acids, gamma-oxo-pyridine-butyric acid, beta-nicotinoyl propionic acid, gamma-acetobutyric acid, delta-oxo-hexanoic acid, delta-oxo-heptanoic acid, delta-oxo-octanoic acid, delta-cyclohexane butyric acid, gamma-benzoyl butyric acid, gamma-tolyl butyric acids, gamma-xyloyl butyric acids, gamma-1- and 2-naphthoyl butyric acids, delta-oxo-pyridinebutyric acid, gamma-nicotinyl butyric acid, delta-oxo-pimelic acid, and gamma-oxo-azelaic acid. The latter two are keto-dicarboxylic acids which may be reacted with ammonium according to the process of this invention to prepare 5-(β-carboxyethyl)-2-pyrrolidone:

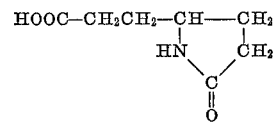

and 6-(γ-carboxypropyl)-2-piperidone:

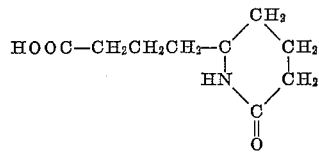

Since the ester group (when $R_2$ is not hydrogen) in the reaction equation hereinbefore set forth splits out during the reaction, the use of methyl, ethyl, propyl and butyl esters, that is the lower alkyl esters, of the foregoing acids are preferably employed. However, other esters such as decycl, dodecyl, benzyl, cyclohexyl may also be used if desired.

As described in the disclosure of the generic concept of this invention, the Schiff's base type reactant can be derived from any of the foregoing keto acids, aldehydic acids or their esters with any of the foregoing primary nitrogen base compounds.

Illustrative of the lactams which can be prepared according to the process of this invention are: 2-pyrrolidone from beta-formylpropionic acid and ammonia, 1-phenyl-2-pyrrolidone from beta-formylpropionic acid and aniline, 1-(beta-hydroxyethyl)-2-pyrrolidone from hydroxyethylamine (ethanol amine) and beta-formylpropionic acid, bis 1,2-[1-(2-pyrrolidone)] ethane from ethylene diamine and beta-formylpropionic acid, bis 1,4-[1-(2-pyrrolidone)]-benzene from p-phenylenediamine and beta-formylpropionic acid, 2-piperidone from ammonium and gamma-formylbutyric acid, 6-methyl-2-piperidone from ammonia and gamma-acetobutyric acid, 1-phenyl-6-methyl-2-piperidone from aniline and gamma-acetobutyric acid, 1-methyl-6-methyl-2-piperidone from methylamine and gamma-acetobutyric acid, 1-cyclohexyl-6-methyl-2-piperidone from cyclohexylamine and gamma-acetobutyric acid, 2-oxo-hexamethylamine (epsilon-caprolactam) from ammonia and delta-formylpentanoic acid, 1-methyl-5-p-tolyl-2-pyrrolidone from beta-(p-toluyl)-propionic acid and methylamine, 1-ethyl-6-(beta-pyridyl)-2-piperidone from ethylamine and gamma-nictotinylbutyric acid, 1-n-propyl-5-n-propyl-2-pyrrolidone from n-propylamine and gamma-oxo-heptanoic acid, 1 - cyclohexyl-6-cyclohexyl-2-piperidone from cyclohexylamine and delta-oxo-cyclohexyl-butyric acid, among others.

The following examples will illustrate the process of this invention.

*Example I*

To prepare 2-methyl-5-pyrrolidone, a stainless steel reactor is charged as follows: 34.8 g. levulinic acid (.3 mole), 10 g. ammonium formate (0.15 mole), 9.3 g. ammonium hydroxide (0.15 mole), 2 g. potassium formate, 4.5 ml. distilled water and 960 p.s.i. CO. The rocking reactor is heated to 200° C. and kept at this temperature for eight hours. Final pressure is 1,150 p.s.i.; maximum pressure reached at 200° C. is 2,150. On releasing the pressure the product foams and forms a brown viscous liquid. It is soluble in water. It distills at 92–96° C./1.1–1.6 mm. (reported 110–3° C./4 mm.), 25 g. of product is collected, 89% yield. The product shows weakly basic and acidic properties. When product is added to dilute solution of sodium bicarbonate, a gas ($CO_2$) is evolved, which indicates the hydrogen on the nitrogen atom is acidic or that the lactam opens up to form a carboxylic acid. When a few drops of concentrated HCl is added to an ether solution of the product, a white precipitate forms which indicates a salt such as amine hydrochloride, is formed. When the product is nitrosated (sodium nitrite and concentrated HCl), a yellow solution forms indicating a nitroso compound and indicating the presence of secondary amine or amide. Infrared analysis indicates a lactam structure.

*Elemental analysis.*—Found: C, 58.98, 59.35; H, 9.07, 9.06; N, 12.61, 12.57. Calculated: C, 60.6; H, 9.1; N, 14.15.

*Example II*

To prepare 1-octadecyl-5-methyl-2-pyrrolidone, a stainless steel reactor (300 ml.) is charged with the following ingredients: 17.42 levulinic acid (.15 mole), 40 g. (0.15 mole) of a mixed octadecylamine known as Armeen 18D, 2 g. potassium formate, 4.5 g. water, 4.5 g. formic acid and 975 p.s.i. CO. With rocking, the reactor is heated to 200° C. and kept at this temperature for five hours. The maximum pressure reached at 200° C. is 2,010 p.s.i. and the final pressure is 1,075. The material in the reactor is removed as a yellow solid plug. About one-half of the material is taken and distilled. The material distilled at 210° C./1.0 mm. A light yellow liquid is obtained which solidifies on standing. The material seems to be neutral and did not react with nitrous acid. Infrared analysis indicates a lactone structure. The following elemental analysis is obtained:

Found: C, 78.93, 79.02; H, 13.03, 13.06; N, 4.27, 4.28. Calculated: C, 78.65; H, 12.83; N, 4.57.

*Example III*

The process of Example I is repeated employing 0.3 mole of methyl levulinate in place of 0.3 mole of levulinic acid. After removal of the methanol by-product, 2-methyl-5-pyrrolidone in substantially equivalent yield is recovered.

*Example IV*

The process of Example II is repeated to prepare 1-octadecyl-5-methyl-2-pyrrolidone by replacing 0.15 mole of levulinic acid with 0.15 mole of ethyl levulinate. A yield of the desired pyrrolidone comparable to that of Example II may be obtained.

*Example V*

The process of Example I is repeated except that 0.5 mole of formic acid is employed to supply the water and carbon monoxide for reaction. Carbon monoxide pressure of 800 p.s.i.g. is imposed on the reactor before heating. A yield of 2-methyl-5-pyrrolidone comparable to that of Example I may be obtained by this process.

*Example VI*

To produce 1-cyclohexyl-5-methyl-2-pyrrolidone, a 300 ml. stainless steel reactor is charged with 25 g. cyclohexylamine (0.25 mole), 38 g. ethyl levulinate (0.25 mole), 2 g. potassium formate, 9.0 g. water and 800 p.s.i.g. carbon monoxide. The reactants are heated at 425° F. for 16 hours. The resulting mixture is added to cold 20% sodium hydroxide solution and extracted with ether. On distillation, the bulk of material distilled at 120–130° C./1.5–2.2 mm. Infrared spectrum shows a major absorption in the lactone region of 6.0 mu. The following is the elemental analyses of the crude 1-cyclohexyl-5-methyl-2-pyrrolidone produced.

Found: C, 71.3, 70.8, 70.6; H, 10.6, 10.7, 10.9; N, 7.6, 7.5. Calculated: C, 72.9; H, 10.5; N, 7.7

*Example VII*

To produce bis 1,4[1-(5-methyl-2-pyrrolidone)] benzene, a 300 ml. stainless steel reactor is charged with 23.2 g. levulinic acid (0.1 mole), 10.8 g. p-phenylenediamine, 4.5 g. water, 2 g. potassium formate, 50 ml. benzene and 770 p.s.i.g. CO. The reactants are heated at 425° F. for seven hours. The novel product can be recovered from the resulting reaction mixture.

*Example VIII*

To produce 1-abietyl-5-methyl-2-pyrrolidone, a 300 ml. stainless steel reactor is charged with 17.4 g. levulinic acid, 45 g. rosin amine (abietylamine, molecular weight approximately 290–300), 4 ml. water, 2 g. potassium formate and 900 p.s.i.g. CO. The reactants are heated at 425° F. A viscous foam is obtained as the reaction mixture which rapidly solidifies to a hard, brittle yellow solid on standing.

*Example IX*

The process of Example VI is repeated except that in place of ethyl levulinate and cyclohexylamine there is employed 0.25 mole of the corresponding Schiff's base. From this process 1-cyclohexyl-5-methyl-2-pyrrolidone is obtained as in Example VI.

It has also been found that the pyrrolidones and piperidones have some value as octane improvers and deicing additives for motor fuels. For example, the RON (research octane number) gain when 5-methyl pyrrolidone was added to leaded (3 cc. tetramethyl lead) gasoline was 0.27 at 1% by volume of the pyrrolidone and 0.15 at 0.5% by volume of the pyrrolidone for a leaded gasoline of 102.4 octane at control level.

What is claimed is:

1. A process for the preparation of 5-methyl-2-pyrrolidone which comprises reacting ammonia and levulinic acid in an alkaline reaction medium at a temperature in the range of from 50 to 350° C. and under a carbon monoxide pressure in the range of from 10 to 1,000 atmospheres.

2. A process for the preparation of 5-methyl-2-pyrrolidone which comprises reacting levulinic acid with ammonium hydroxide in an alkaline reaction medium at a temperature in the range of from 50 to 350° C. and under a carbon monoxide pressure in the range of from 10 to 1,000 atmospheres.

3. A process for the preparation of a 1-alkyl-5-methyl-2-pyrrolidone which comprises reacting levulinic acid with a primary alkyl amine at a temperature in the range of from 50 to 350° C. in an alkaline reaction medium and under a carbon monoxide pressure in the range of from 10 to 1,000 atmospheres.

4. A process for the preparation of a 1-octadecyl-5-methyl-2-pyrrolidone which comprises reacting levulinic acid with an octadecylamine, under a carbon monoxide pressure of from 10 to 1,000 atmospheres and a temperature of from 50° to 350° C. in the presence of an alkaline catalyst.

5. A process which comprises heating at a temperature in the range of 50 to 350° C. under carbon monoxide pressure of 10 to 1,000 atmospheres and in an alkaline reaction medium 0.1 to 10 mole water per mole of compound of the formula:

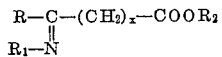

wherein $x$ is a number from 2 and 3, R is selected from the class consisting of hydrogen and $C_1$ to $C_{10}$ alkyl, cycloalkyl, aryl, alkaryl, and aralkyl hydrocarbon groups and $R_1$ is selected from the class consisting of hydrogen and alkyl, cycloalkyl, aryl, alkaryl and aralkyl hydrocarbon groups of 1 to 20 carbon atoms, $R_2$ is selected from the class consisting of hydrogen and $C_1$ and $C_4$ alkyl hydrocarbon groups forming a lactam of the structure

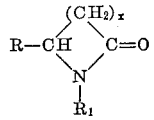

wherein R, $R_1$ and $x$ are as above defined.

No references cited.

AXEL MAZEL, *Primary Examiner.*

NICHOLAS S. RIZZO, *Examiner.*

JOSE TOVAR, *Assistant Examiner.*